Sept. 25, 1928.
A. G. GRAHAM
CARPENTER'S RULE
1,685,486
Filed July 14, 1925
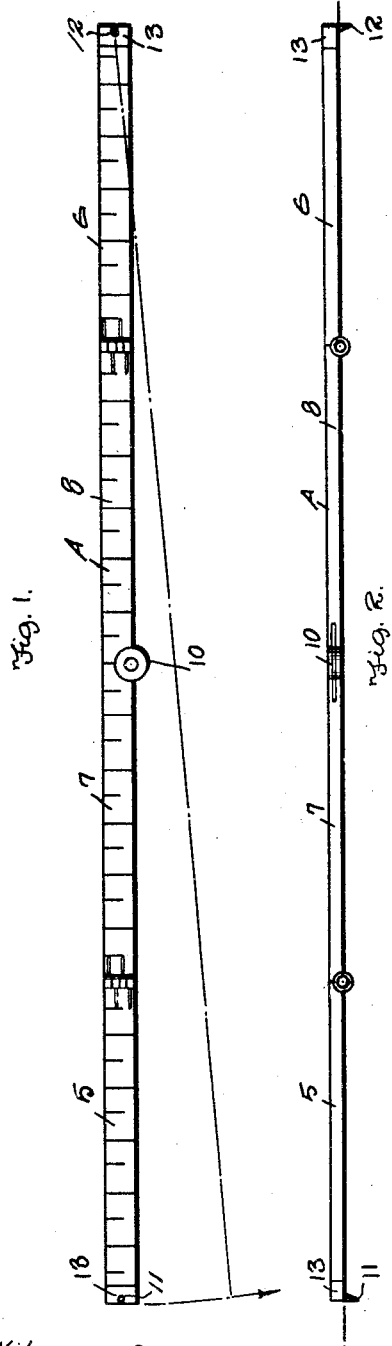
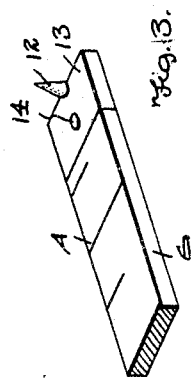
A. G. Graham, Inventor
By Richard B. Owen
Attorney
Witnesses
C. E. Churchman Jr.
George Wright Patented Sept. 25, 1928.

1,685,486

UNITED STATES PATENT OFFICE.

ALBERT G. GRAHAM, OF MONETTE, ARKANSAS.

CARPENTER'S RULE.

Application filed July 14, 1925. Serial No. 43,585.

This invention relates to a novel measuring device and has for its primary object the provision of a carpenter's rule, which can be used for measuring any distance with a relatively short rule, without the necessity of marking the work at each end of the rule, as the rule is advanced over the work during the measuring process.

Another object of the invention is the provision of a rule having points at each end thereof for engaging the work to permit the rule to be swung around on the work, as the rule is advanced over the work, without the slipping of the rule and without the necessity of marking the work.

A further object of the invention is the provision of novel means for incorporating the points with the rule, whereby the said points can be placed upon conventional rules now on the market as well as rules in the course of manufacture.

A still further object of the invention is to provide an improved carpenter's rule of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawings, in which drawings:

Figure 1 is a plan view of the improved rule,

Figure 2 is an edge elevation of the same and

Figure 3 is a detail perspective view of one end of the rule showing the novel pivot point connected therewith, Referring to the drawings in detail, wherein similar reference characters designate corresponding parts throughout the several views, the letter A generally indicates the improved rule, which as shown is of the folding type embodying end sections 5 and 6 and intermediate sections 7 and 8, which are connected by the conventional knuckle or elbow joints 10. The rule is provided with relatively narrow longitudinal side faces and wide flat graduated faces.

In accordance with this invention the outer ends of the end sections 5 and 6 have connected therewith pivot points 11 and 12 respectively and these points are flush with the free ends of the said sections 5 and 6 and are adapted to engage the work incident to the measuring thereof, as will be hereinafter more fully described. The points 11 and 12 can be connected with the terminals of the rule in any desired way, and as shown the points are carried by the ends of sleeves 13 which are of a polygonal shape in cross section to receive the free ends of the rule. Thus the sleeves 13 are slipped directly over the rules and are held against displacement thereon by the means of a suitable rivet or fastening pin 14. The points 11 and 12 project laterally from the wide graduated faces of the rule.

In use of the improved rule provided with the pivot points 11 and 12, if a board twelve feet long is to be measured and the rule is of a two foot length, it is merely necessary to square one end of the board and place one end of the rule flush with the squared end thereof. The opposite end of the rule is pressed down on the board until the pivot point penetrates into the board and the rule is swung around thereon until another two foot length is measured after which the other point is pressed in the board and the rule swung around thereon. This process continues until the desired length is measured.

From the foregoing description, it can be seen that a novel rule has been provided, in which the necessity of marking the work incident to the measuring thereof is entirely eliminated.

Changes in details may be made without departing from the spirit or the scope of this invention, but:

What I claim as new is:

In a carpenter's rule, the combination with a body consisting of a plurality of alined sections having their adjacent ends hingedly connected together and provided with longitudinally extending side edges and oppositely disposed substantially wide graduated faces, of pivot pins rigidly carried by the free ends of the outer sections of the rule and projecting laterally from one of said wide graduated faces and extending at right angles with respect thereto, the outer sides of the pins lying flush with the said free ends of the outer sections.

In testimony whereof I affix my signature.

ALBERT G. GRAHAM.